United States Patent [19]

Tezuka et al.

[11] Patent Number: 5,516,200
[45] Date of Patent: May 14, 1996

[54] CONTROLLER FOR TRACTOR TRAILER BRAKING DEVICES

[75] Inventors: Naoto Tezuka, Fujisawa; Tomoyuki Kubomiya, Kawasaki, both of Japan

[73] Assignee: Isuzu Motors Limited, Tokyo, Japan

[21] Appl. No.: 413,987

[22] Filed: Mar. 30, 1995

[30] Foreign Application Priority Data

Jun. 30, 1994 [JP] Japan ................................. 6-149739

[51] Int. Cl.⁶ ..................................................... B60T 7/20
[52] U.S. Cl. ........................... 303/7; 188/3 R; 188/106 P; 188/273; 303/3; 303/13
[58] Field of Search .................................. 303/7, 2–3, 15, 303/20, 18–19, 13, 14, 9.61, 89; 188/3 R, 3 H, 112 R, 151 A, 273, 154, 271, 106 P, 265; 477/188, 208; 192/4 A; 307/10.1

[56] References Cited

U.S. PATENT DOCUMENTS

| | | | |
|---|---|---|---|
| 2,997,144 | 8/1961 | Gsching et al. | 188/154 |
| 3,068,050 | 12/1962 | Pekrul | 477/188 |
| 4,061,215 | 12/1977 | Ishikawa | 188/273 |
| 4,235,320 | 11/1980 | Polak et al. | 188/271 |
| 5,231,896 | 8/1993 | Kota | 192/4 A X |

Primary Examiner—Douglas C. Butler
Attorney, Agent, or Firm—Kanesaka & Takeuchi

[57] ABSTRACT

A controller of the invention is used for tractor trailer braking devices having a service brake, an exhaust brake and a retarder brake for a tractor, and a retarder brake for a trailer. The controller includes a main operating switch situated at a driver seat for controlling the exhaust brake and the tractor and trailer retarder brakes, a first interlocking switch for interlocking between the service brake and the tractor and trailer retarder brakes, a second interlocking switch for locking the tractor retarder brake, a first device to detect a condition of an accelerator pedal, a second device to detect a condition of a clutch, a third device to detect a condition of a brake pedal, and a fourth device to detect a condition of a trailer brake. The controller can effectively utilize the exhaust brake, and the tractor and trailer retarder brakes according to the driver's intention.

7 Claims, 6 Drawing Sheets

Fig. 2

| Accelerator Pedal | Brake Pedal | Clutch | Trailer Brake Interlocking SW | Main Operating SW: Retarder-Srvs Brake Interlocking SW — Interlocking | | | Not Interlocking | | | Main Operating SW: All Off — Retarder-Trailer Brake Interlocking SW — Interlocking | | | Not Interlocking | | |
|---|---|---|---|---|---|---|---|---|---|---|---|---|---|---|---|
| | | | | Tractor Retarder | Trailer Retarder | Exhaust Brake | Tractor Retarder | Trailer Retarder | Exhaust Brake | Tractor Retarder | Trailer Retarder | Exhaust Brake | Tractor Retarder | Trailer Retarder | Exhaust Brake |
| Depressed | Depressed | Engaged | On | O | O | | | | | | | | | | |
| Depressed | Depressed | Engaged | Off | O | O | | | | | | | | | | |
| Depressed | Depressed | Disengaged | On | O | O | | | | | | | | | | |
| Depressed | Depressed | Disengaged | Off | | O | | | | | | | | | | |
| Depressed | Released | Engaged | On | | O | | | | | | | | | | |
| Depressed | Released | Engaged | Off | | | | | | | | | | | | |
| Depressed | Released | Disengaged | On | | | | | | | | | | | | |
| Depressed | Released | Disengaged | Off | | | | | | | | | | | | |
| Released | Depressed | Engaged | On | O | O | | O | O | | | O | | | | |
| Released | Depressed | Engaged | Off | O | O | | O | O | | | O | | | | |
| Released | Depressed | Disengaged | On | O | O | | O | O | | | O | | | | |
| Released | Depressed | Disengaged | Off | O | O | | O | O | | | O | | | | |
| Released | Released | Engaged | On | | O | | | | | | O | | | | |
| Released | Released | Engaged | Off | | | | | | | | O | | | | |
| Released | Released | Disengaged | On | | O | | | | | | O | | | | |
| Released | Released | Disengaged | Off | | | | | | | | O | | | | |

Fig. 3

| Accelerator Pedal | Retarder-Srvs Brake Interlocking SW | | | Main Operating SW | | | | | | | | | | | |
|---|---|---|---|---|---|---|---|---|---|---|---|---|---|---|---|
| | Retarder-Trailer Brake Interlocking SW | | | Off | | | | On | | | | | | | |
| | Brake Pedal | Clutch | Trailer Brake | | | | | Interlocking | | | Not Interlocking | | | | |
| | | | | Tractor Retarder | Trailer Retarder | Exhaust Brake | | Tractor Retarder | Trailer Retarder | Exhaust Brake | Tractor Retarder | Trailer Retarder | Exhaust Brake | | |
| Depressed | Depressed | Engaged | On | ○ | ○ | | | ○ | ○ | | ○ | ○ | | | |
| | | | Off | ○ | ○ | | | ○ | ○ | | ○ | ○ | | | |
| | | Disengaged | On | ○ | ○ | | | ○ | ○ | | ○ | ○ | | | |
| | | | Off | | ○ | | | | ○ | | | ○ | | | |
| | Released | Engaged | On | | ○ | | | | | | | | | | |
| | | | Off | | | | | | | | | | | | |
| | | Disengaged | On | | | | | | | | | | | | |
| | | | Off | | | | | | | | | | | | |
| Released | Depressed | Engaged | On | ○ | ○ | ○ | | ○ | ○ | ○ | | ○ | ○ | | |
| | | | Off | ○ | ○ | ○ | | ○ | ○ | ○ | | | ○ | ○ | | |
| | | Disengaged | On | ○ | ○ | | | ○ | ○ | | | ○ | | | |
| | | | Off | | ○ | ○ | | | ○ | ○ | | | ○ | ○ | | |
| | Released | Engaged | On | | ○ | | | | ○ | | | | | | |
| | | | Off | | | | | | ○ | | | | | | |
| | | Disengaged | On | | | | | | | | | | | | |
| | | | Off | | | | | | | | | | | | |

Fig. 4

| Main Operating SW | | | | | | | | | | | | | | | | | |
|---|---|---|---|---|---|---|---|---|---|---|---|---|---|---|---|---|---|
| Retarder-Srvs Brake Interlocking SW | | | | Retarder Brake | | | | | | | | | | | | | |
| Retarder-Trailer Brake Interlocking SW | | | | Interlocking | | | | Not Interlocking | | | | Interlocking | | | | Not Interlocking | |
| Accelerator Pedal | Brake Pedal | Clutch | Trailer Brake | Tractor Retarder | Trailer Retarder | Exhaust Brake | | Tractor Retarder | Trailer Retarder | Exhaust Brake | | Tractor Retarder | Trailer Retarder | Exhaust Brake | | Tractor Retarder | Trailer Retarder |
| Depressed | Depressed | Engaged | On | ○ | ○ | | | ○ | ○ | | | | | | | | |
| | | | Off | ○ | ○ | | | ○ | ○ | | | | | | | | |
| | | Disengaged | On | ○ | ○ | | | ○ | ○ | | | | | | | | |
| | | | Off | ○ | ○ | | | | | | | | | | | | |
| | Released | Engaged | On | | | | | | | | | | ○ | | | | |
| | | | Off | | ○ | | | | | | | | | | | | |
| | | Disengaged | On | | | | | | | | | | ○ | | | | |
| | | | Off | | | | | | | | | | | | | | |
| Released | Depressed | Engaged | On | ○ | ○ | | | ○ | ○ | | | ○ | ○ | ○ | | ○ | ○ |
| | | | Off | ○ | ○ | | | ○ | ○ | | | ○ | ○ | ○ | | ○ | ○ |
| | | Disengaged | On | ○ | ○ | | | ○ | ○ | | | ○ | ○ | | | | |
| | | | Off | ○ | ○ | | | ○ | ○ | | | ○ | ○ | | | | |
| | Released | Engaged | On | | ○ | | | | | | | | | | | | |
| | | | Off | | ○ | | | | | | | | | | | | |
| | | Disengaged | On | | | | | | | | | | | | | | |
| | | | Off | | | | | | | | | | | | | | |

Fig. 5

CONTROLLER FOR TRACTOR TRAILER BRAKING DEVICES

BACKGROUND OF THE INVENTION AND RELATED ART STATEMENT

This invention relates to a controller for auxiliary braking devices on tractor trailers equipped with auxiliary braking devices, such as exhaust brakes and retarder brakes.

FIGS. 6A and 6B show examples of the tractor trailers.

FIG. 6A shows a full tractor trailer (1) which is comprised of a tractor (10) and a trailer (20). The tractor (10) has an engine with an exhaust brake (12), rear drive wheels (16), and a retarder (referred to as "tractor retarder") (14) placed between a transmission output axis and driving wheels (16). The trailer (20), which is connected to the tractor (10) via a coupler (22), has non powered, free rolling front wheels (23) and rear wheels (24), and a retarder (referred to as "trailer retarder") (26) arranged at a differential gear (25) that couples the left and right rear wheels (24).

FIG. 6B shows a semi-tractor trailer (1A) which is comprised of a tractor head (30) and a trailer (40). The tractor head (30) has an engine with an exhaust brake (12), rear drive wheels (34), and a tractor retarder (14) placed between a transmission output axis and the drive wheels (34). A trailer retarder (26) is connected to a differential gear (43) that couples left and right rear wheels (42) of the trailer (40).

This type of retarder is disclosed in Japanese Laid-Open Utility Model No. 5-54130 (1993).

This type of tractor trailer is equipped with control switches for the exhaust brake and retarders, operated by the driver.

Switching patterns for the braking devices, however, are diversified, and it is difficult to maintain optimum operating conditions at all times because, depending on the driving (braking) conditions, the exhaust brake, tractor brake and trailer retarder respectively have their own unique "braking properties" and "effects on interlocking properties of the vehicles when braking".

For instance, it is difficult to perform optimal switching while driving under the following conditions:

(1) The braking force of the exhaust brake is large when in low gears, and that force is only effective for the tractor. Thus, when used alone, the exhaust brake may cause the truck to so called "jackknife". Drivers should avoid using the exhaust brake or, if its use is unavoidable, the simultaneous use of a trailer retarder is required.

(2) When using the trailer retarder, the driver may desire to operate the trailer retarder alone if rear pulling is required on a downhill. On the other hand, the driver may need to simultaneously operate the tractor retarder and exhaust brake if a large braking force is desired.

(3) When all the retarders are used, it is not impossible to pull from the rear by using the trailer retarder alone, even when the driver desires to correct the attitude of the vehicle on a downhill.

This invention provides a controller for optimal control of the above-mentioned braking devices.

SUMMARY OF THE INVENTION

The controller in this invention is equipped with a main operating switch at the driver seat, an interlocking on-off switch for service brake and retarder brake, an interlocking on-off switch for trailer brake and auxiliary braking device, means to detect the condition of an accelerator pedal, means to detect the condition of a clutch, means to detect the condition of a brake pedal, and means to detect the condition of the trailer brake. The main operating switch has a position to make the exhaust brake operative, a position to make the retarder brake operative, and a position to make both the exhaust and retarder brakes operative.

The exhaust brake operates when the main operating switch is either in the exhaust brake operative position or in the exhaust and retarder brakes operative position if the accelerator pedal is released and the clutch is engaged. The trailer retarder brake operates under one of three following conditions: the service brake-retarder interlocking switch is in the interlocking position and the brake pedal is depressed; the trailer brake-retarder interlocking switch is in the interlocking position and the trailer brake is on; and the main operating switch is either in retarder brake operative or exhaust and retarder brakes operative position and the accelerator pedal is released while clutch is engaged. The tractor retarder brake operates under one of the following two conditions: the service brake-retarder interlocking switch is in the interlocking position while the brake pedal is depressed; and the main operating switch is either in retarder brake operative or exhaust and retarder brakes operative position while the accelerator pedal is released and the clutch is engaged.

BRIEF DESCRIPTION OF THE DRAWINGS

FIG. 2 is a chart indicating the operation patterns of the controller in this invention;

FIG. 3 is another chart indicating the operation patterns of the controller in this invention;

FIG. 4 is another chart indicating the operation patterns of the controller in this invention;

Figure 5:
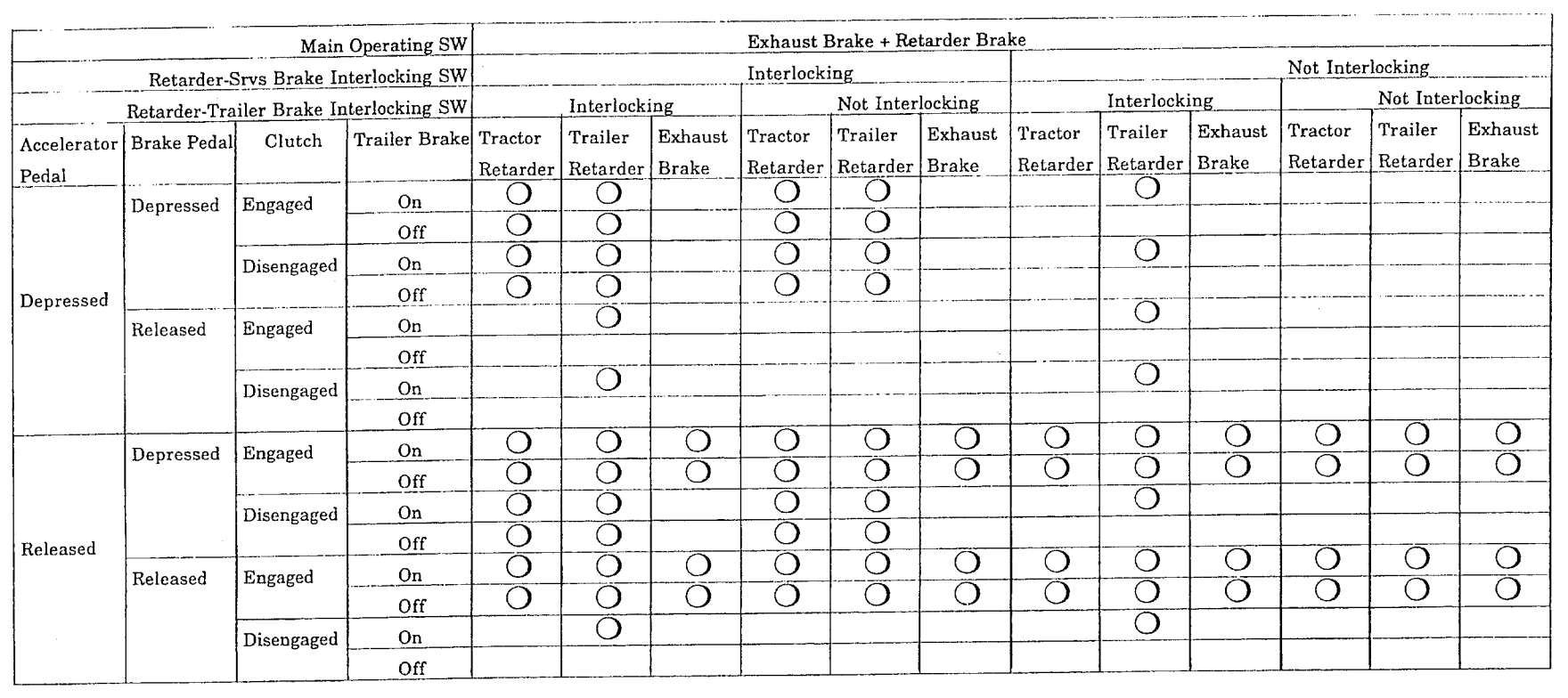

FIG. 5 is another chart indicating the operation patterns of the controller in this invention.

PREFERRED EMBODIMENTS OF THE INVENTION

Figure 1:
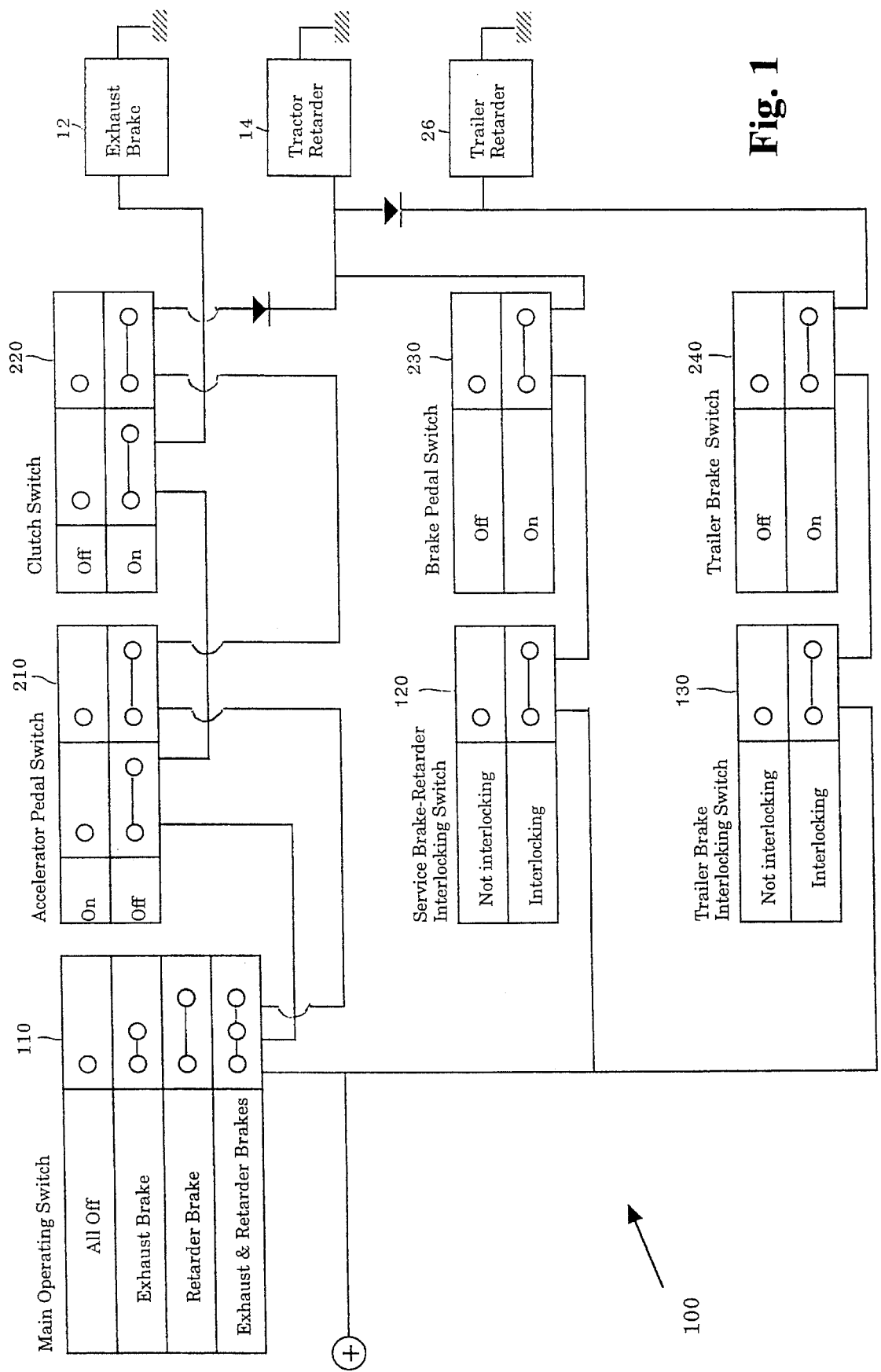
FIG. 1 is a circuit diagram of the controller in this invention.
Figure 6A:
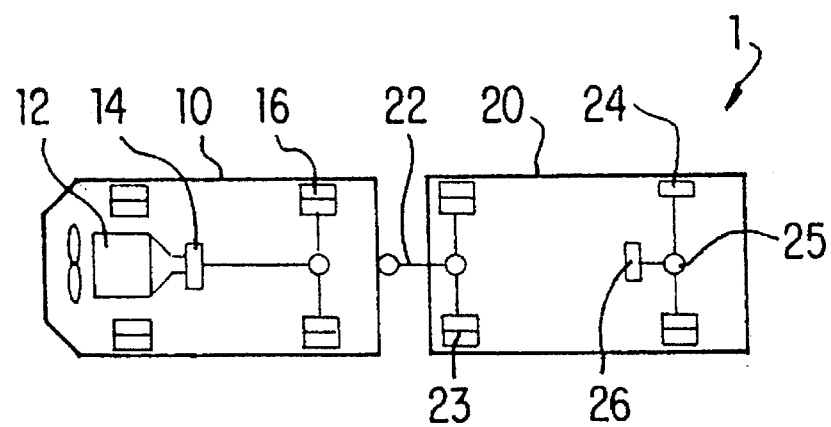
FIGS. 6A and 6B are diagrams describing the structures of the tractor trailers.
Figure 6B:
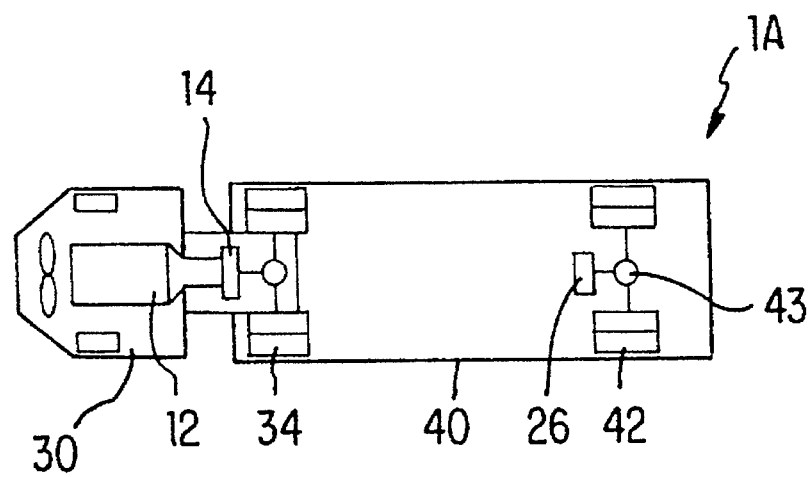

FIG. 1 is a circuit diagram of the controller in this invention.

A controller (100) is located at the driver seat and is equipped with three switches: a main operating switch (110) operated by the driver, a service brake-retarder interlocking switch (120), and a trailer brake-auxiliary braking device interlocking switch (130). It is also equipped with an accelerator pedal switch (210), a clutch switch (220), a brake pedal switch (230), and a trailer brake switch (240) in order to determine the driving (braking) conditions based on the driver's driving actions.

The main operating switch (110) is in a single unit format formed of a multi-level lever switch, or a rotary switch, in order to avoid complicated operations.

For easy operation it is desirable to have only an on-off switch. For convenience, however, it is necessary to separate the retarders which generate certain levels of braking force according to the vehicle speed, and the exhaust brake which has a large variance of braking force depending on the transmission gear position. In general, it is easier to use a three-level system of (OFF→←exhaust brake→←exhaust brake+retarder) or (Off→←—retarder→←—exhaust brake+retarder).

The service brake-retarder interlocking switch (120) is used to prevent fading of the brakes while the service brake is in use, or to extend the service life of the brake linings or pads. The retarders alone are sequentially operated in order to achieve certain levels of braking force that corresponds to the vehicle speed for easier operation of the service brake. In addition, as the braking force of the retarders becomes greater, the effect of the interlocking (sequential operations) increases. Thus, both tractor and trailer retarders are sequentially operated. This operation can be overridden to prevent over braking under light load conditions.

The trailer brake interlocking switch (130) causes the trailer retarder to operate simultaneously with the trailer brake because the trailer brake is used in order to correct the attitude of the vehicle in situations such as driving downhill. A trailer brake lever is established at the driver seat of the tractor in order to open and close a brake valve for independent operation of the trailer brake.

Prolonged or frequent use of the trailer brake, when correcting or maintaining the vehicle's attitude on a downhill, causes the trailer brake to fade. Thus, when the service brake is used, only the tractor brake is effective to cause jackknife or insufficient overall braking force. Brake fading is prevented by interlocking the trailer retarder with the trailer brake, allowing the trailer retarder to share the energy absorbed by the trailer brake. This operation can be cancelled to prevent over braking of the trailer brake under light load conditions.

The accelerator pedal switch (210) detects whether the accelerator pedal is depressed or released, and is similar to the conventional accelerator pedal switches for exhaust brakes. When braking force is desired, the accelerator pedal is normally released, and the switch turns on the retarders if the main operating switch is on. On the other hand, when the accelerator pedal is depressed, the switch turns the retarders off since generally no braking force is required.

When the interlocking switch is in the interlocking position, however, the interlocking switch supersedes the accelerator pedal switch. With the interlocking switch, the trailer retarder can be operated while the tractor is in a driving state (accelerator depressed). Attitude correction is effective as the tractor is pulled forward while the trailer is decelerated.

The clutch switch (220) detects whether the clutch is engaged or disengaged, and is similar to the conventional clutch switch for auxiliary uphill starter devices. The main operating switch is often maintained in "on" position while driving, especially at high speeds, because it is not convenient for the driver to operate the main operating switch every time the accelerator is released, and the aforementioned accelerator pedal switch is equipped to quickly generate braking force. Under these conditions, when the driver shifts the gears, i.e. shifting up while accelerating or shifting down on an uphill, etc., the vehicle decelerates against the driver's intention because generally the accelerator pedal is released. In order to prevent this, the clutch switch is used to make the retarders inoperative when the clutch is disengaged.

However, when the interlocking switch (120) is in the interlocking position, it supersedes the clutch switch, since engine brake force is not available when the brake is actuated while the clutch is disengaged and more retarder braking force is desired compared to when the clutch is engaged.

The brake pedal switch (230) detects whether the brake pedal is depressed or released, and is similar to conventional stop lamp switches. When the service brake-retarder interlocking switch (120) is in the interlocking position, the switch turns the retarders on as it functions sequentially with the depressed brake pedal.

The trailer brake switch (240) detects whether the trailer brake is on or off. When the trailer brake interlocking switch (130) is in the interlocking position, it turns the retarders on as it functions sequentially with the operation of the trailer brake.

The controller in this invention is equipped with the above-mentioned various switches, and its circuit is formed in such a way as to achieve the following logic.

(1) Exhaust brake (12)

Exhaust brake (12) is on, when the main operating switch (110) is either in exhaust brake position, or in exhaust and retarder brakes position in which the accelerator pedal is released and the clutch is engaged.

(2) Trailer retarder (26)

a) Trailer retarder (26) is on when the service brake-retarder interlocking switch (120) is in the interlocking position and the brake pedal is depressed.

b) Trailer retarder (26) is on when the trailer brake-retarder interlocking switch (130) is in the interlocking position and the trailer brake is on.

c) Trailer retarder (26) is on when the main operating switch (110) is either in retarder brake position, or in exhaust and retarder brakes position in which the accelerator pedal is released and the clutch is engaged.

(3) Tractor retarder (14)

a) Tractor retarder (14) is on when the service brake-retarder interlocking switch (120) is in the interlocking position and the brake pedal is depressed.

b) Tractor retarder (14) is on when the main operating switch is in either retarder brake position, or in exhaust and retarder brakes position in which the accelerator pedal is released and the clutch is engaged.

FIGS. 2–5 are summary charts of the on-off conditions of the tractor retarder, trailer retarder, and exhaust brake corresponding to the main operating switch positions. Circles in the charts indicate "on" states for each of the auxiliary braking devices.

As described above, the controller in this invention is equipped with a main operating switch at the driver seat, an interlocking switch for a service brake-retarder brake, and a trailer brake interlocking switch for a tractor trailer with auxiliary braking devices, such as exhaust brakes and retarder brakes.

Drivers, by setting those switches in advance, can utilize the auxiliary braking devices to maximum effect corresponding to specific driving conditions.

Drivers' intentions are controlled by signals from sensors, such as accelerator pedal switch, clutch switch, brake pedal switch, and trailer brake switch, and the controller selects the most desirable pattern for use of the auxiliary braking devices.

The circuit that performs the controller logic can be formed of various relays or microcomputer software.

What is claimed is:

1. A controller for tractor trailer braking devices including a service brake, an exhaust brake and a retarder brake for a tractor, and a retarder brake for a trailer, comprising:

a main operating switch situated at a driver seat for controlling the exhaust brake and the tractor and trailer retarder brakes, a first interlocking switch for interlocking between the service brake and the tractor and trailer retarder brakes, a second interlocking switch for locking the trailer retarder brake, first means to detect a condition of an accelerator pedal and connected to the main operating switch, second means to detect a condition of a clutch and connected to the first means, third means to detect a condition of a brake pedal and connected to the first interlocking switch, and fourth means to detect a condition of a trailer brake and connected to the second interlocking switch.

2. A controller for tractor trailer braking devices as claimed in claim 1, wherein said service brake is a main brake for the tractor trailer, and the exhaust brake and the tractor and trailer retarder brakes are auxiliary brakes.

3. A controller for tractor trailer braking devices as claimed in claim 2, wherein the main operating switch includes at least three of following four positions: a first position for making all the auxiliary braking devices inoperative, a second position for making the exhaust brake operative, a third position for making the two retarder brakes operative, and a fourth position for making both the exhaust and retarder brakes operative, said main operating switch including the first and fourth positions.

4. A controller for tractor trailer braking devices as claimed in claim 3, wherein the exhaust brake is operative when the main operating switch is in one of the second position; and the fourth position, and when the first means for the accelerator pedal is released and the second means for the clutch is engaged.

5. A controller for tractor trailer braking devices as claimed in claim 3, wherein the trailer retarder brake is operative under one of the following three conditions: the first interlocking switch is in an interlocking position while the third means detects that the brake pedal is depressed; the second interlocking switch is in the interlocking position while the fourth means for the trailer brake is on; and the main operating switch is in one of the third position for the retarder brakes and the fourth position for the exhaust and retarder brakes, while the first means for the accelerator pedal is off and the second means for the clutch is engaged.

6. A controller for tractor trailer braking devices as claimed in claim 3, wherein the tractor retarder brake is operative under one of the following two conditions: the first interlocking switch is in an interlocking position while the third means detects that the brake pedal is depressed; and the main operating switch is in one of the third position for the retarder brake and the fourth position for the exhaust and retarder brakes, while the first means for the accelerator pedal is off and the second means for the clutch is engaged.

7. A controller for tractor trailer braking devices as claimed in claim 1, wherein said second means is connected to the exhaust brake and the tractor retarder brake, said third means is connected to the tractor retarder brake and the trailer retarder brake, and said fourth means is connected to the trailer retarder brake.

* * * * *